United States Patent [19]

Waits et al.

[11] 4,414,511
[45] Nov. 8, 1983

[54] LOW RESISTANCE, FLUID REPLENISHING, REFERENCE CELL AND METHOD FOR USING SAME IN STRUCTURE-TO-SOIL ELECTRICAL SURVEYS

[75] Inventors: Charles G. Waits, Hanover Park; Karl W. Nicholas, Roselle, both of Ill.; James B. Bushman, Medina, Ohio

[73] Assignee: Harco Corporation, Medina, Ohio

[21] Appl. No.: 176,915

[22] Filed: Aug. 11, 1980

[51] Int. Cl.³ .................. G01V 3/15; G01N 27/30; G01R 31/00
[52] U.S. Cl. .................. 324/347; 324/71.1; 324/348; 324/450
[58] Field of Search .................. 324/52, 54, 62, 65 P, 324/71 R, 72, 347, 348, 357, 425, 446, 450, 149

[56] References Cited

U.S. PATENT DOCUMENTS

| | | | |
|---|---|---|---|
| 1,163,469 | 12/1915 | Schlumberger | 324/348 |
| 2,400,678 | 5/1946 | Archie | 324/347 X |
| 2,974,276 | 3/1961 | Davis | 324/348 X |
| 3,735,249 | 5/1973 | Stoll | 324/348 |
| 4,088,945 | 5/1978 | Howell et al. | 324/347 X |
| 4,151,458 | 4/1979 | Seager | 324/357 |

Primary Examiner—Gerard R. Strecker
Attorney, Agent, or Firm—Maky, Renner, Otto & Boisselle

[57] ABSTRACT

A reference cell for conducting closely spaced buried structure-to-soil electrical surveys uses a soil contact cell adapted to be mounted on the lower end of a pole or cane to be held by the surveyor walking over the right-of-way of the buried structure such as an underground pipeline. The cell includes a fluid chamber on the lower end of the pole or cane and includes on the lower end of the chamber a ground contact pad. A spring loaded bottom wall or boot closes the chamber and is operative to reduce the volume of the chamber when the lower end of the chamber is forced by the pole into contact with the ground above the buried structure. The reduction in volume of the chamber forces fluid through the contact pad to the ground to insure good electrical contact. Fluid in the chamber may be continuously replenished by a make-up supply carried by the surveyor which is drawn from the supply by return of the boot to its unstressed state. The ground contact pad may be porous and/or provided with a fluid flow opening which is opened when the pad is forced against the ground.

34 Claims, 4 Drawing Figures

U.S. Patent     Nov. 8, 1983     4,414,511
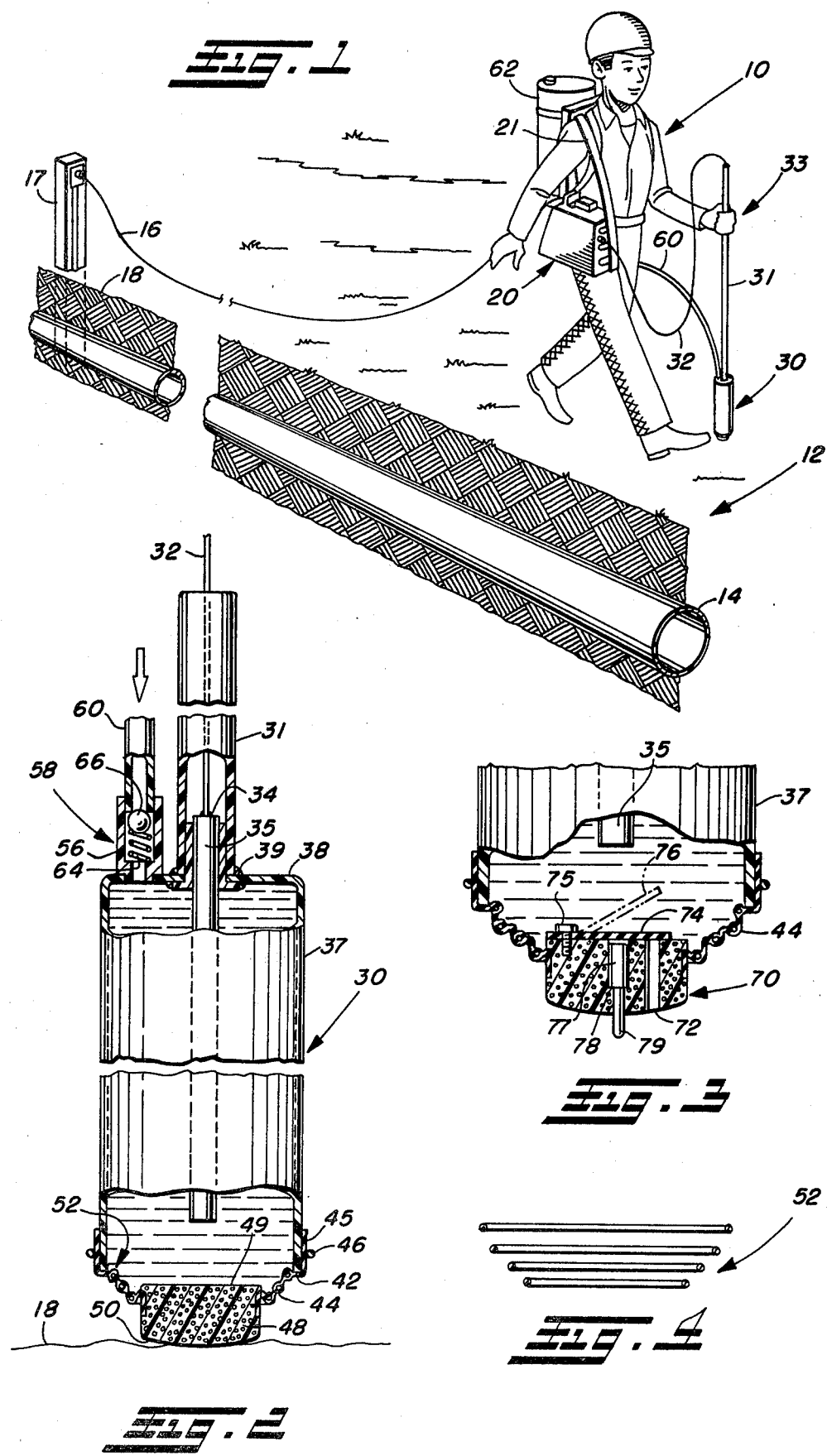

LOW RESISTANCE, FLUID REPLENISHING, REFERENCE CELL AND METHOD FOR USING SAME IN STRUCTURE-TO-SOIL ELECTRICAL SURVEYS

The present invention relates generally as indicated to reference cells for structure-to-soil potential difference surveys such as disclosed in prior U.S. Pat. No. 4,151,458 to William H. Seager.

BACKGROUND OF THE INVENTION

Closely spaced pipe-to-soil surveys are conducted periodically of buried structures such as pipelines to monitor cathodic protection and to locate areas of potential problems.

Such electrical surveys require a contact to the pipe, a suitable voltmeter or potentiometer, and a means of contacting the ground. A copper-copper sulfate (CU-CUSO4) cell is an industry standard for providing the necessary contact with the ground. Also used are silver-silver chloride zinc-zinc chloride, calomel electrodes, as well as other metal-liquid reference electrodes. Such cells or electrodes are illustrated in the above-noted Seager U.S. patent. Reference may also be had to the early Schlumberger U.S. Pat. No. 1,163,469 for further illustration of such type of electrode. Such electrodes are usually mounted on the lower end of the pole or cane which is hand held by the surveyor.

Such electrodes have a relatively small area of contact resulting in rather high contact resistance between the electrode or reference cell in the earth. If the resistance between the reference electrode and the earth is relatively high and, therefore, represents a significant portion of the total circuit resistance, then the voltmeter in the circuit will read significantly lower voltage value than actually exists between the reference cell and the structure which is being monitored. Generally the resistance of the metal paths including the lead wire and the metal structure are relatively small and the only two significant resistances exist at the voltmeter and at the contact between the cell or the electrode and the earth. As an example, if the measuring voltmeter has an effective resistance of one million ohms and the reference cell resistance is five hundred thousand ohms, the voltmeter then registers only two-thirds of the actual voltage difference that exists between the reference cell and the structure in the earth.

This is a particular problem in dry soils, sandy soils or rock laden areas. Readings become a small fraction of what they should be. It has long been recognized that meaningful surveys can best be conducted in moist soil conditions. Good surveys can be obtained in the rain or with snow on the ground. Unfortunately, inclement weather involving rain or snow is not conducive to significant productivity when walking over the right-of-way. The best productivity can be obtained when the right-of-way is dry and the weather is good.

The problems encountered when surveying under dry conditions have long been recognized as seen, for example, in Jakoski U.S. Pat. No. 2,105,247 wherein a spray is employed to dampen the surface of the earth next to the contacts. However, such sprays or the fluid containers therefor are usually employed with vehicle mounted survey equipment and not conventional or industry standard pole held reference cells such as seen in the aforenoted Seager U.S. Pat. No. 4,151,458. Accordingly, there is a need to provide a readily available fluid or electrolyte supply to a standard reference cell which is pole or hand held to insure that the relatively small area of contact has a sufficiently low resistance to enable meaningful readings to be obtained when surveying dry, sandy soil or rocky soil conditions.

SUMMARY OF THE INVENTION

With the present invention electrical surveys of buried structures may readily be accomplished by utilizing copper-copper sulfate cells or other suitable metal-liquid cells, adapted to be mounted on the lower end of a hand held pole or cane. Such cells are generally similar to the industry standard. However, with the present invention the reliability of the survey in dry, sandy or rock soil conditions is greatly improved.

The cell of the present invention comprises a canister or container mounted on the lower end of a pole, the upper end of which is adapted to be conveniently hand held by someone walking. Within the canister is a copper rod fixedly secured in and projecting from the lower end of the pole. The copper rod is connected by a lead wire through the top of the pole to a voltmeter or the like carried by the surveyor. The lower end of the canister is provided with a flexible closure or wall which includes at its center the ground contact pad as well as to the lower edge of the canister.

The wall is in the form of a flexible impervious boot which has embedded therein a volute spring coiling or spiraling toward the center or pad, while also extending axially downwardly in the unstressed state. The spring is in the form of an axially extending spiral or Archemedies. The ground contact pad may be porous and/or provided with a fluid passage port. If provided with the port, a flapper valve may be provided on the top of the port actuated by a ground contact plunger projecting through the pad.

An electrolyte such as copper sulfate solution is supplied to the top of the canister from a container carried by the surveyor through a flexible hose. A check valve permits the solution to flow only from the container to the canister.

In operation when the surveyor presses the bottom of the cell against the earth, the spring loaded wall flexes upwardly reducing the volume of the chamber within the canister thus creating an internal pressure which forces the electrolyte through the pad and onto the ground thus maintaining the bottom of the pad moist with electrolyte to reduce the contact resistance thereof. When the operator lifts the cell off the ground the bottom wall returns to its original position increasing the volume of the chamber of the canister drawing a make-up supply of electrolyte through the check valve from the container. In this manner any electrolyte which is forced through the pad and deposited on the earth at the contact point is continually replenished from the container carried by the surveyor.

It is accordingly a principal object of the present invention to provide a pole mounted copper-copper sulfate reference cell for conducting electrical surveys wherein the amount of electrolyte in the cell can be continually replenished.

It is another important object to provide a reference cell for conducting surveys in dry, sandy or rocky soil conditions which will improve the electrical resistance between the earth and cell.

It is also an object to provide a cell which will improve the contact resistance when the right-of-way contains dry debris such as hay or wild grasses which have been cut or mown.

Another important object is the provision of a cell which can be used in conducting electrical surveys in adverse soil conditions which will provide more meaningful results.

It is also an object to provide a reference cell for conducting electrical surveys which includes a canister on the bottom of a hand held pole which in turn includes a yielding wall on the lower end thereof operative to reduce the volume of the chamber of the canister when the cell is forced against the ground.

Conversely, it is also an object that the wall enlarge the volume when the cell is removed from the ground.

Still another object is the provision of a hand or pole held reference cell for conducting electrical surveys wherein the supply of copper sulfate solution or other electrolyte in the cell can be continuously replenished as the survey is conducted.

Yet another object is the provision of a reference cell similar to the industry standard which includes a mechanism for insuring a replenished supply of electrolyte at the cell-earth contact area.

It is also an object to provide a reference cell which includes a canister wherein a wall of the canister yields upon forcing the cell against the earth in turn to force electrolyte to the cell-earth contact area to reduce the resistance of such contact.

Still another object is the provision of a reference cell for conducting electrical surveys which includes a porous contact pad and a bottom wall surrounding the pad which continually forces electrolyte through the pad.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a broken perspective view illustrative of a cell of the present invention in use during a survey being conducted;

FIG. 2 is an enlarged elevation broken away and partially in section of a preferred form of cell in accordance with the present invention;

FIG. 3 is a further enlarged elevation partially broken away and in section of another embodiment of the present invention; and FIG. 4 is an enlarged transverse section of the volute spring which may be embedded in the bottom wall or boot covering the lower end of the canister of the cell.

DESCRIPTION OF THE PREFERRED EMBODIMENTS

Referring now in detail to the drawing and initially to FIG. 1, there is illustrated a surveyor shown generally at 10 conducting a survey in accordance with the present invention. The surveyor is alone and is walking over the right-of-way 12 of a buried structure 14 which illustrated is a sub-surface pipeline.

Trailing behind the surveyor along the right-of-way is a small gauge economically disposable wire 16 which is connected behind the surveyor to a test lead station 17 which projects above the surface of the earth 18 on the right-of-way 12. The test lead station 17 provides a convenient electrical connection to the pipeline at a known location. The test lead station 17 is usually one of many installed at known locations along the pipeline right-of-way at periodic intervals of from two to three kilometers, for example. The wire 16 is preferably enameled copper magnet wire and is of light weight such as shown and described in the aforementioned Seager U.S. Pat. No. 4,151,458. The wire is sufficiently light weight that the surveyor 10 may carry with him several spools of the wire which may readily be spliced together.

The spools may be carried in the case 20 by the surveyor 10 with the assistance of shoulder strap 21. The case 20 carried by the operator may include a meter, a wire supply and a wire length transducer or location determining device. Both the transducer and the meter feed information to a micro-computer control which in turn feeds the information obtained to a data storage medium. The meter may be a conventional digital difference meter capable of being automatically read by a computer, or it may be an analog to digital converter with appropriate input signal conditioning circuitry or the equivalent means to provide information understood by the computer to represent the potential difference information. The wire length transducer automatically feeds data to the computer representing the length of wire paid out which is a representation of the distance of the surveyor from a known location or test station 17.

The data storage medium may be a solid state battery powered magnetic tape or disk information storage medium or the equivalent. After the data is obtained in the storage medium it may subsequently be processed through a computer to obtain a graphic print-out of the information obtained by the survey. Reference may be had to the copending application of Joseph Rog et al, Ser. No. 017,180, filed Mar. 5, 1979, entitled "Electrical Survey Apparatus and Method", now U.S. Pat. No. 4,322,805 dated Mar. 30, 1982, assigned to Harco Corporation of Medina, Ohio, for a more detailed description of the components which may be carried by the surveyor and their utilization to obtain electrical surveys of the buried structure.

The meter carried by the surveyor 10 in the case 20 is also electrically connected to reference cell 30 mounted on the bottom of pole 31. The electrical connection may be through a small gauge insulated wire seen at 32 which extends through the top of the pole 31. The pole and the electrode may be of a suitable height so that it can conveniently be grasped by the hand of the operator as seen at 33. If desired, the operator may carry two cells 30, each mounted on the lower end of a pole, one carried by each hand.

Referring now to FIG. 2, it will be seen that the lead wire 32 extends down through the hollow top of the pole 31 and is connected at 34 to the top of a copper rod 35 which is secured in the lower end of the pole by a sealed fitting 36. The rod projects through the fitting and projects downwardly into canister 37 throughout most of its vertical length. The top wall 38 of the canister is secured to the lower end of the pole as seen at 39.

The canister 37 may be in the form of a right circular cylindrical container which has an open bottom edge 42. Closing the bottom end of the canister is a flexible boot shown generally at 44. The boot extends over the exterior of the wall of the canister at its lower end as seen at 45 and may be secured and sealed to the exterior of the lower end of the canister by the wire cinch seen at 46. The boot 44 extends downwardly and inwardly to enclose and sealingly embrace ground contact pad 48. The ground contact pad may be formed of a porous ceramic material adapted to pass liquid therethrough at a controlled flow rate. It will be seen that the top 49 of the pad 48 is exposed to the interior of the canister while the bottom 50 is slightly radiused and is adapted to contact the earth 18. It will be appreciated that the bottom of the pad may be pointed or provided with another suitable shape depending on the soil or debris conditions encountered.

Embedded in the molded bottom wall or boot 44 is a spring 52 as seen alone in FIG. 4. The spring 52 is in the form of a volute spring coiling or spiraling toward the center or pad 48 from the wall of the canister while also extending axially downwardly in the unstressed state. The spring is in the form generally of an essentially extending spiral Archemedies. Thus in FIG. 2, with the spring in its unstressed state, the bottom wall or boot forms a generally conical projection from the bottom edge 42 of the wall of the canister.

It will be appreciated that the flexible wall of the canister providing the pumping action may be the top wall at the connection with the pole. Also, in lieu of a spring embedded in the boot, the boot may be molded to provide the desired spring loading. The boot may, for example, be molded of rubber or plastic to provide an accordian wall or be in the general shape of a common household plunger.

The top wall 38 of the canister is provided with an axially extending projection seen at 56 which constitutes a housing for check values 58. The upper end of the housing is connected to a flexible tube 60 which extends from the canister to a container 62 carried by the surveyor 10 as seen more clearly in FIG. 1. The container 62 may contain for example, several liters of copper sulfate solution or other electrolyte which is carried by the surveyor at an elevation substantially higher than the canister of the cell 30.

The check valve may comprise a spring 64 in the housing 56 and a ball check element 66 closing the lower end of the flexible tube 60. The pressure head created by the elevation difference between the container 62 and the canister of the cell is not ordinarily sufficient to open the check valve. However, when the cell is pressed against the ground and the bottom wall or boot 44 is flexed upwardly, thus reducing the volume of the canister, the check valve remains closed. When the cell is lifted from the ground the boot returns to its unstressed projecting state enlarging the volume of the canister opening the valve and drawing make up electrolyte into the canister. The flexure of the boot acts as a diaphragm pump. If desired, the flexible tube 60 may be provided with a flow control valve, manually operated, to control the amount of fluid or solution entering the chamber of the canister from the container 62.

It will also be appreciated that the cell may be used on short surveys without the container 62 and flexible tube. In such case, the check valve simply acts as an air vent permitting the top of the chamber of the canister to fill with air which is compressed when the cell is forced against the ground.

As seen in FIG. 3, there may be provided on the lower end of the cell a ground contact pad indicated at 70. The pad is secured to the smaller and projecting end of the boot 44 in the same manner as in FIG. 2. However, the pad is provided with one or more fluid passages seen at 72 which extend vertically therethrough.

The top of the port 72 is normally closed by a flexible spring flapper valve element seen at 74 secured to the pad by a suitable fastener 75. The flapper valve element is opened to the phantom line position 76 by a vertically movable plunger 77. The plunger includes an enlarged end to provide a shoulder seen at 78. The smaller end of the plunger projects through and somewhat beyond the bottom of the pad as seen at 79. The shoulder seats the plunger in its retracted position in a hole in the pad which is designed to fit the plunger in its retracted position shown. When the surveyor presses the pad against the ground the plunger elevates to the phantom line position 80 flexing the flapper valve element open to permit fluid to flow through the port or ports 72.

The pad is nonetheless secured to the center of the flexible boot 44 closing the bottom end of the canister. With the memory of the flexible boot, when the cell is pressed against the ground the pad moves upwardly increasing the pressure in the canister forcing the fluid to the contact area. When the cell is lifted from the ground, the valve element 74 closes and the memory or spring within the flexible boot pushes the bottom wall downwardly enlarging the chamber of the canister drawing make-up solution or air into the canister through the check valve 38.

It will be noted that all of the materials of the cell which come into contact with the electrolyte, with the exception of the copper rod 35, are non-metallic. Even the volute spring 52 may be plastic as well as the components of the check valve 58. The canister 37 may be a clear plastic with an opaque interior coating with the exception of a narrow vertical slit, through which the surveyor may check the liquid level in the canister. The coating protects the liquid from the affects of the rays of the sun. The pole may be a light weight plastic tube or bamboo, for example.

We claim:

1. A reference cell assembly for conducting electrical earth surveys comprising a liquid-metal cell, means to support the cell and periodically to move the cell to force it against the earth and then to remove it from the earth, and means coupled with respect to the cell for automatically responding to such movement for automatically supplying make-up liquid to the cell.

2. A cell as set forth in claim 1 wherein said cell comprises a canister on the lower end of a pole.

3. A cell assembly as set forth in claim 2 wherein a wall of the canister is in the form of a spring loaded diaphragm operative to vary the volume of said canister in response to such movement.

4. A cell assembly as set forth in claim 3 wherein said wall is the bottom wall, and a porous earth contact pad in the center of said wall.

5. A cell assembly as set forth in claim 4 including at least one hole in said pad, and means responsive to the forcing of the cell against the earth to open said hole.

6. A cell assembly as set forth in claim 5 including means responsive to the removal of the cell from the earth to close the hole.

7. A cell assembly as set forth in claim 4 including at least one hole in such pad, valve means operative to open and close said hole in response to forcing it against the earth and removing it from the earth, respectively.

8. A cell assembly as set forth in claim 7 wherein said valve means includes a plunger actuator projecting below said pad.

9. A cell assembly as set forth in claim 7 including a check valve in the top of said cell.

10. A cell assembly as set forth in claim 9, including a liquid make-up supply connected to said cell, said check valve being between said cell and supply permitting liquid to flow only from said supply to said cell.

11. A cell as set forth in claim 1 wherein said cell is a copper-copper sulfate cell.

12. A cell as set forth in claim 1 wherein said cell is a silver-silver chloride cell.

13. A cell as set forth in claim 1 wherein said cell includes a flexible boot on the lower end thereof with a volute spring embedded therein.

14. A reference cell assembly for conducting electrical earth surveys comprising a liquid-metal cell, means to support the cell and to move the cell periodically to force it against the earth and then to remove it from the earth, an earth contact pad on the lower end of the cell, at least one hole in said pad, closure means for normally closing said hole, and means coupled with respect to the cell for automatically responding to the forcing of the cell against the earth to effect operation of said closure means to open said hole.

15. A reference cell assembly as set forth in claim 14 including means responsive to removing it from the earth to close said hole.

16. A reference cell as set forth in claim 15 said closure means comprising valve means operative to open and close said hole.

17. A reference cell as set forth in claim 16 wherein said means responsive comprising a plunger actuator projecting below said paid.

18. A reference cell for conducting electrical surveys of buried structures comprising a pole, a fluid chamber on the lower end of said pole, electrical means electrically coupled to fluid in said fluid chamber for electrically coupling the same with respect to survey equipment to effect such survey, a spring loaded wall closing such chamber operative to enlarge the volume of such chamber when said pole is lifted from contact with the ground above such buried structure, wherein said wall is the bottom wall and includes a porous ground contact paid in said bottom.

19. A reference cell as set forth in claim 18 including a make-up supply of fluid, and means to draw such fluid into the chamber when said volume is enlarged.

20. A reference cell as set forth in claim 14 wherein said cell is a copper-copper sulfate or silver-silver chloride cell.

21. A reference cell as set forth in claim 19 including a check valve between the supply and chamber permitting flow only to the chamber.

22. A reference cell as set forth in claim 19 wherein such make-up supply of fluid is air.

23. A reference cell as set forth in claim 18 wherein said wall comprises a boot with a volute spring embedded therein.

24. A method of conducting closely spaced electrical surveys of buried structures comprising the steps of moving over the buried structure with a liquid-metal reference cell electrically connected with respect to the structure, and periodically forcing the cell against the earth to obtain electrical potential difference information and removing it from the earth, such cell having a supply of fluid therein, changing the volume of such cell in response to such movement, and utilizing such volume change to automatically replenish the supply of fluid in such cell.

25. A method of conducting closely spaced electrical surveys of a buried structure comprising the steps of moving over the buried structure with a liquid-metal reference cell electrically connected to the structure and periodically forcing the cell against the earth and removing it from the earth, such cell having a supply of fluid therein, utilizing such movement of the cell to automatically replenish the supply of fluid therein, and sensing potential difference between the structure and the earth via such reference cell while such reference cell is engaged with the earth.

26. A method of conducting closely spaced electrical surveys of a buried structure comprising the steps of moving over the buried structure with a liquid-metal reference cell electrically connected to the structure and periodically forcing the cell against the earth and removing it from the earth, such cell having a supply of fluid therein, utilizing such movement of the cell to replenish the supply of fluid therein, sensing potential difference between the structure and the earth via such reference cell while such reference cell is engaged with the earth, carrying a liquid make-up supply connected to the cell, and utilizing such movement of the cell to pump liquid from the supply to the cell.

27. A method as set forth in claim 26 including the step of precluding liquid flow from the cell to the make-up supply.

28. A method as set forth in claim 25 including the step of providing a porous earth contact pad on said cell, and utilizing such movement to force liquid through the pad.

29. A method of conducting closely spaced electrical surveys of a buried structure comprising the steps of moving over the buried structure with a liquid-metal reference cell electrically connected to the structure and periodically forcing the cell against the earth and removing it from the earth, such cell having a supply of fluid therein, utilizing such movement of the cell to replenish the supply of fluid therein, sensing potential difference between the structure and the earth via such reference cell while such reference cell is engaged with the earth, providing a porous earth contact pad on said cell, utilizing such movement to force liquid through the pad, providing a hole in such pad, and utilizing such movement to open and close such hole.

30. A method of conducting closely spaced electrical surveys of a buried structure comprising the step of moving over the buried structure with a liquid-metal reference cell electrically connected to the structure and periodically forcing the cell against the earth and removing it from the earth, such cell having a supply of fluid therein, utilizing such movement of the cell to replenish the supply of fluid therein, and sensing potential difference between the structure and the earth via such reference cell while such reference cell is engaged with the earth, and wherein the supply of fluid replenish is air.

31. A method as set forth in claim 25 wherein said cell is mounted on the lower end of a pole, and such movement is obtained manually.

32. A method as set forth in claim 25 including the step of changing the volume of such cell in response to such movement.

33. A method of conducting closely spaced electrical surveys of buried structures comprising the steps of moving over the buried structure with a liquid-metal reference cell electrically connected with respect to the structure, and periodically forcing the cell against the earth to obtain electrical potential difference information and removing it from the earth, changing the volume of such cell in response to such movement, providing the cell with an earth contact pad, and utilizing such volume change to force fluid through such pad.

34. A method of conducting closely spaced electrical surveys of buried structures comprising the steps of moving over the buried structure with a liquid-metal reference cell electrically connected with respect to the structure, and periodically forcing the cell against the earth to obtain electrical potential difference information and removing it from the earth, such cell having a supply of fluid therein, changing the volume of such cell in response to such movement, and utilizing such volume change to expel fluid from the cell.

* * * * *